APPARATUS FOR IMMERSION OF FACE PUMPED LASER DEVICES

Filed June 7, 1967

Inventors:
Joseph P. Chernoch,
William S. Martin,
by John F. Ahern
Their Attorney.

United States Patent Office 3,534,291
Patented Oct. 13, 1970

3,534,291
APPARATUS FOR IMMERSION OF FACE
PUMPED LASER DEVICES
William S. Martin, Latham, and Joseph P. Chernoch,
Scotia, N.Y., assignors to General Electric Company,
a corporation of New York
Filed June 7, 1967, Ser. No. 644,142
Int. Cl. H01s 3/00
U.S. Cl. 331—94.5
8 Claims

ABSTRACT OF THE DISCLOSURE

The light flux density impinging upon a face pumped active laser medium is increased by a value of up to $n^2$, where $n$ is the index of refraction of the active laser medium, by immersing the medium in a cone or equivalent solid angle segment of an optically transmissive medium having an index of refraction equal to or greater than that of the active laser medium. This invention may be utilized in connection with any active laser medium which is optically pumped and is equally applicable to resonant and nonresonant laser structures.

RELATED APPLICATIONS

Figure 1:
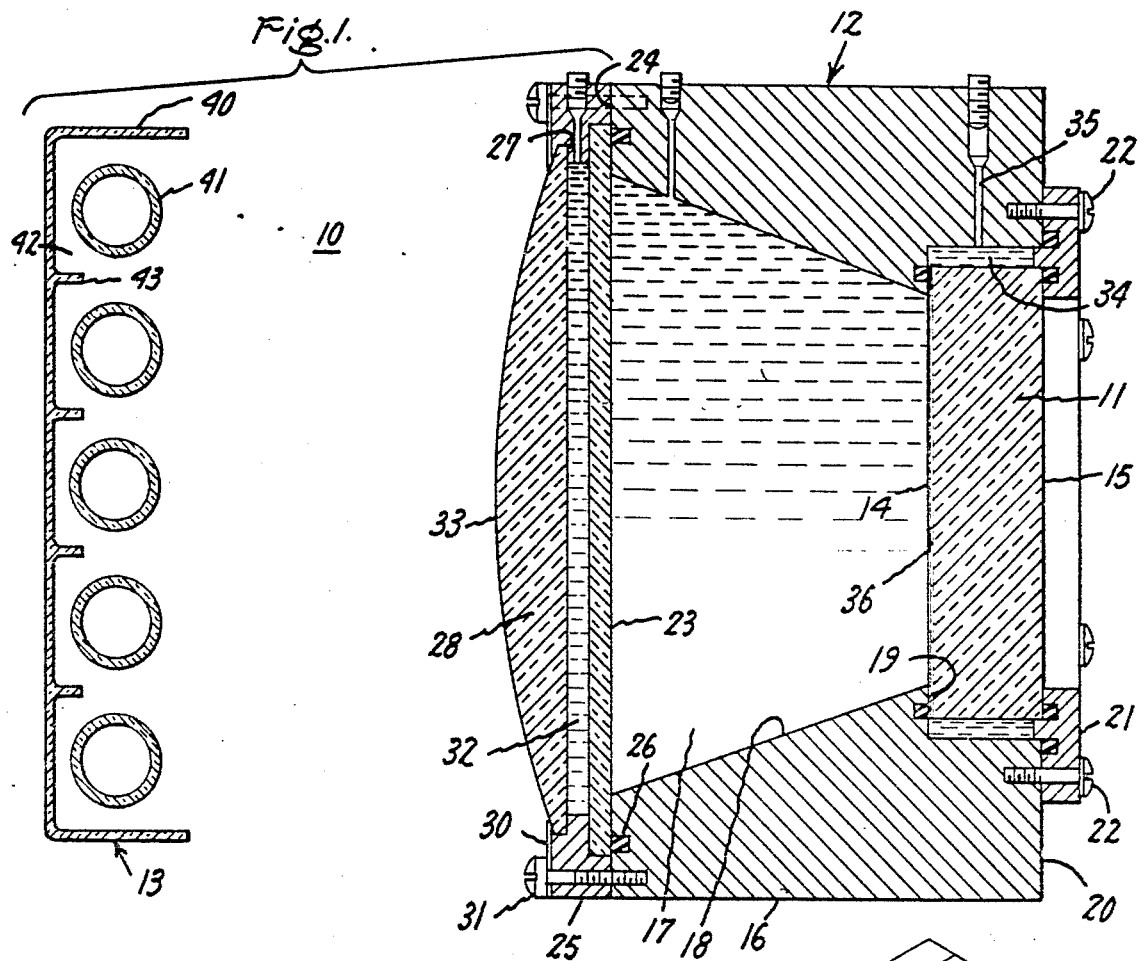

The present application is related to the copending applications of Joseph P. Chernoch, Ser. No. 315,054, filed Oct. 9, 1963, now U.S. Pat. 3,423,693; application Ser. No. 467,941 of K. Tomiyasu and J. C. Almasi, filed June 29, 1965; and the application of Joseph P. Chernoch, Ser. No. 491,921, filed Oct. 1, 1965, now U.S. Pat. 3,466,569, all of which are assigned to the present assignee.

Laser devices, now well known to the art, are devices which generate, or amplify, and emit coherent electromagnetic radiation at higher frequencies than microwave frequencies, generally in the infrared and visible portions of the electromagnetic spectrum. For purposes of this description, such wavelengths of radiation will be denominated "optical radiation." The light emission from the laser device is characterized by a narrow wavelength spread, i.e., the light is essentially monochromatic, and by its spatial coherence or "in-phase" relationship.

Because of the coherence of the emission of laser devices, laser beam divergence is generally small and such beams are adapted to transmit high energies for great distances. Laser devices may be fabricated from any active medium in which a population inversion may be established by suitable "pumping." Some such active laser media are neodymium glass, ruby, carbon dioxide, and helium-neon mixtures, to mention only a few. A particular type of laser device disclosed and claimed in various environments, modifications and combinations in the aforementioned related copending applications is the "face-pumped" or "disc" laser. Face-pumping of laser devices is highly advantageous in that it permits the substantially uniform activation, across the laser aperture, with pumping radiation of a large diameter laser body, thus achieving high energy output without introducing undesirable effects of high energy pumping which exist in rod-type laser bodies.

Face-pumped lasers are most generally in the form of a cylinder of revolution about a line that is substantially normal to the faces of the active laser medium forming a "disc," which may be circular, elliptical, rectangular, or have any other convenient cross section, as desired. Generally, face-pumped or disc lasers, to utilize the advantages thereof set forth hereinbefore, have a thickness dimension along a line normal to the major faces thereof which is small as compared with the transverse dimension across the faces thereof and, typically, is no greater than the longitudinal dimension. For purposes of illustration and ease of description, the use of the word "disc" herein will be in the connotation of a right circular cylindrical body, however, this is by way of illustration only and is not to be construed as a limiting definition.

Coherent emission in laser devices requires "population inversion," a condition which exists when a substantial number of the possible atomic or molecular radiating species in the active laser medium are raised to a metastable energy state above the ground state of the species. When this condition exists, an incident photon of the laser emission wavelength may stimulate a radiative transition from a metastable level to a lower level, which may or may not be the ground state of the species. Such radiative transitions are cumulative and self-stimulating, resulting in the emission of radiation which is coherent and in-phase. Population inversion is, for example, achieved by irradiation of the laser medium with a high intensity of electromagnetic radiation at a wavelength of appropriate energy to raise the radiating specie to a metastable state when the radiation is absorbed thereby. Such inversion-causing radiation is referred to as "pumping radiation" and the wavelength of the pumping or activating radiation is known as the "pumping" wavelength.

The present invention is directed to optical pumping, wherein the activation, or the creation of a population inversion, essential for coherent electromagnetic radiation, is achieved by optical pumping, namely the irradiation of the active medium with optical radiation as set forth hereinbefore. The source of the pumping radiation is generally referred to as the "pump" or "pumping means."

With the development of the face-pumped laser or disc laser, the limiting factor of the ability to extract energy from the active medium without limitations imposed by the active medium itself have been largely overcome. Presently, a serious limitation upon the amount of coherent radiation which may be achieved from an active laser medium in the face-pumped configuration is the amount of inversion which may be created therein. The amount of inversion created within an active laser medium is a function of the flux density (energy per unit area) of the pumping optical radiation incident thereupon. It is desirable that means be provided for increasing the amount of pumping radiation which may be incident upon an active surface of a face-pumped laser device.

Accordingly, an object of the present invention is to provide means for increasing the flux density of optical pumping radiation upon the active face of a laser device, Yet another advantage of the present invention is to increase the optical flux density irradiating a face pump laser device, Still another object of the present invention is to provide face-pump laser apparatus having increased inversion and increased coherent radiation without resorting to expensive and complicated pumping arrangements.

Briefly stated, in accord with the present invention, we provide apparatus for providing a flux density of optical pumping of a face-pumped laser disc device wherein the flux density incident upon an active face thereof approaches $n^2$ times the optical flux density emitted by the pumping medium by optically immersing the laser disc in a material having an index of refraction equal to or greater than the index of refraction of the active laser medium. Such optical immersion may be utilized in conjunction with any active laser medium and is equally applicable to resonant and non-resonant laser structures.

Figure 2:
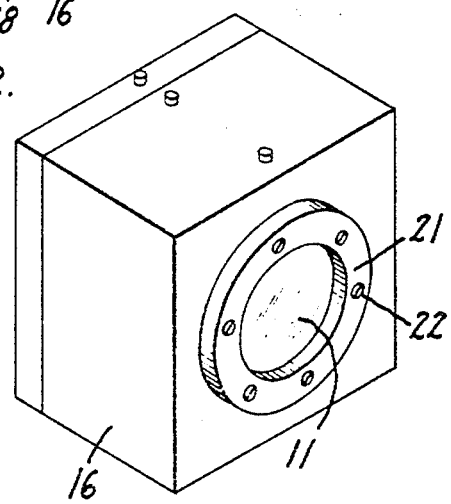
Figure 3:
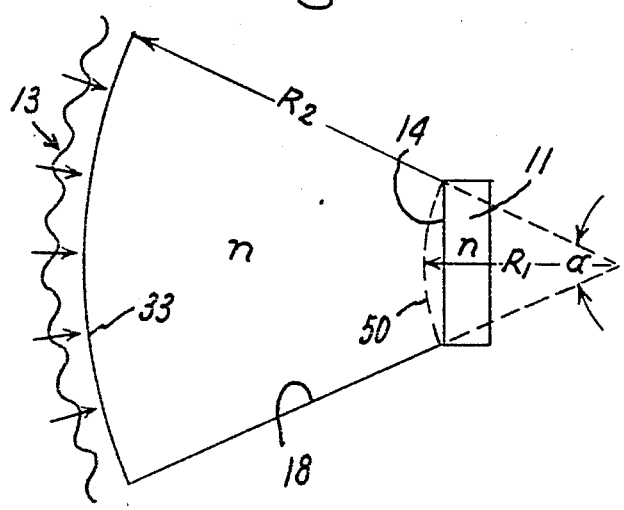

The novel features believed characteristic of the present invention are set forth in the appended claims. The invention itself, together with further objects and advantages thereof, may best be understood with reference to the following description taken in connection with the appended drawing in which:

FIG. 1 illustrates, in vertical cross-section, an immersion structure for a face-pump laser device, FIG. 2 is a perspective view of a device constructed according to FIG. 1 of the drawing, and FIG. 3 is a schematic representation of the immersion technique utilized in the present invention useful in understanding the operation thereof.

FIG. 1 of the drawing illustrates a laser module 10 utilizing the optical immersion technique of the present invention and includes an active laser medium 11, an immersion assembly 12, and optical pumping means 13. Laser medium 11, for purposes of explanation, may conveniently be a right circular cylindrical body having a pumped, active surface 14 and an emitting surface 15 of an active laser medium, as for example, 4% neodymium-doped glass, available from American Optical Company, of Pittsburgh, Pa., under the nomenclature AOLux #1689. Immersion means 12 may conveniently include a suitable metallic block 16 having a right circular cylindrical or right regular parallelepiped configuration and having therein a conical interior cavity 17 bounded by a conical surface 18, alternatively, cavity 17 may be in the form of a polyhedral section as, for example, a tetrahedral section. A counterbore 19 having a diameter slightly larger than the diameter of active laser means 11 is cut in a first face 20 of block 16. A suitable clamp 21 in the form of a disc-mounting ring is mounted upon face 20 of block 16 by a plurality of bolts 22 to facilitate the mounting of laser means 11 in block 16.

A thin glass disc 23 having substantially the same index of refraction $n$ as that of active laser medium 11 is connected in fluidtight seal with a second face 24 of block 13 and is clamped thereto with an annular ring 25 (and is sealed thereto by an O-ring 26). A shoulder 27 in ring 25 receives a plano-convex lens 28 which is held against ring 25. A mounting disc ring 30, held in place with a plurality of bolts 31, securely fastens plano-convex lens 28 to ring 25. Plano-convex lens 28 has an index of refraction $n$, equal to that of active laser medium 11. The space 32 between glass disc 23 and plano-convex lens 28 is filled with a 10% potassium chromate in water solution, for example, which serves as a filter for radiation incident thereupon and is chosen as a band pass filter to pass the pumping wavelength to which the active laser element 11 is sensitive and the absorption of which causes a population inversion therein.

When active laser medium 11 comprises a 4% neodymium-doped glass, the pumping wavelength is a wavelength of approximately 5,000 to 9,000 AU and the active medium emits selectively coherent radiation at approximately 1.06 microns. Under these circumstances, it is desirable that filter 32 contained within the space between glass disc 23 and plano-convex member 28 be selected to pass wavelengths of 5,000 to 9,000 AU. A 10% solution of potassium chromate in water is suitable to pass wavelengths of approximately 5,000 to 10,000 AU, and may conveniently be utilized in this respect. It should be obvious, however, that numerous short wavelength and long wavelength filters are available and the filter materials may be chosen, dependent upon the wavelength to which the active laser material is subject to being activated to a population inversion. Similarly, the solution utilized as the filter is chosen so as to have an index of refraction that provides a substantially homogeneous optical path between the outer surface 33 of the plano-convex lens 28 and the pumped surface 14 of active laser material 11.

The volume within conical cavity 17 in block 16 is filled with a liquid having an index of refraction $n$ equal to the index of refraction of the active laser medium 11. Thus, the conical segment comprising liquid filled cavity 17, glass disc 23, filter 32, and plano-convex lens 28 comprises a conical section of a symmetric spherical shell, the outer surface of which is surface 33 of plano-convex lens 28 and the inner surface of which is approximated by surface 14 of active laser material 11. The lateral surfaces of laser active material 11 are surrounded by an annular cavity 34 which is filled with a material which absorbs radiation at the laser emission wavelength in order to prevent transverse reflections and possible spurious modes. Cavity 34 may be filled through filling port 35.

Surface 14 of active laser material 11 is coated with a multiplicity of thin dielectric layers 36 which are transparent to the pumping optical wavelength, denominated herein as the first wavelength, and are substantially 100% reflective to the laser output wavelength, denominated herein as the second wavelength. Alternatively, these dielectric layers may be placed on a separate, optically-transparent substrate located between glass disc 23 and active laser medium 11. Pumping means 13 comprises a suitable reflector 40 which may, for example, be fabricated from alumina and a plurality of discharge lamps 41, as for example xenon flash lamps, arranged in a parallel array, each included in a reflective module 42 defined by partially encircling ribs 43 of reflector 40. In operation, the pumping means 13 is moved in close juxtaposition with the exterior surface 33 of plano-convex lens 28. Although illustrated herein as having a planar configuration, ideally, the array of lamps constituting pumping means 13 should have a configuration which most nearly approximates exterior spherical surface 33 of plano-convex lens 28.

FIG. 2 illustrates, in perspective, a laser module (less the pumping means) constructed in accord with the present invention and comprising an aluminum alloy block having a conical bore therein polished to optical smoothness with the laser disc in a right circular cylindrical form encased therein and in which the plano-convex lens (not visible) and the volume 17 within the cone is filled with glycerine, which has an index of refraction of approximately 1.47 approximately equal to the index of refraction of the neodymium glass laser disc. Although glycerine is utilized to match the index of refraction of neodymium glass, other suitable materials may be used to accomplish this, such as for example, benzyl-benzoate and tetrachloroethylene. These materials, however, are useful only with neodymium-doped glass, and with other active laser materials other substances may be necessary.

FIG. 3 of the drawing illustrates a schematic view governing the optics of the system of the present invention. In FIG. 3, the surface 14 of active laser medium 11 approximates a spherical surface cap 50 of radius $R_1$ and the exterior surface 33 of plano-convex lens 28 of FIG. 1 is a portion of the surface of a concentric sphere of radius $R_2$ where $R_2 \geq nR_1$. Assume that the pumping means provides an isotropic energy flux density in watts/cm.$^2$ represented by $W_B$ incident upon surface 33. If the interface at surface 33 has a hemispherical transmissivity $\tau$, an energy flux density $W_B\tau$ is transmitted through surface 33 and directed inwardly toward the spherical surface cap of radius $R_1$. The conical surface 18 serves to contain this transmitted radiation and concentrate it as it moves toward the spherical surface cap of radius $R_1$. It can be shown analytically that the energy flux density $W_{R_1}$ incident upon the entire surface 50 of a spherical surface cap of radius $R_1$ surrounded by conical surface 18 and a spherical cap 33 of radius $R_2$, and with spherical cap 33 irradiated with the aforementioned energy flux density, would receive an energy flux density equal to $$W_{R_1} = n^2 \tau W_B$$

where $n$ is the index of refraction within radius $R_2$, and where the slight loss due to reflections from conical surface 18 is ignored.

Next, to apply the foregoing relationship to FIG. 3 of the drawing, and considering the disc 11 and the medium within conical section 17 of FIG. 1 to have an index of refraction $n$, it is apparent that the total input energy $E_2$ incident upon the spherical surface 33 is the flux density $W_B$ times the area of the spherical cap, $2\pi R_2^2(1-\cos \alpha/2)$. Thus $E_2 = W_B 2\pi R_2^2(1-\cos \alpha/2)$. Similarly the total energy $E_1$ crossing the spherical surface 50 is $W_{R_1} 2\pi R_1^2(1-\cos \alpha/2)$. Then if $R_1 = R_2/n$ and $$W_{R_1} = n^2 \tau W_B$$

it may be shown that $E_1 = \tau E_2$. Thus, excepting transmission losses (and reflection losses at the conical surface), all of the energy incident upon spherical surface 33 crosses the spherical surface 50. Furthermore, to the extent that the disc surface 14 approximates spherical surface 50, it receives the energy equally efficiently. The fact that the planar disc surface has less area than the spherical surface cap 50 causes it to receive less total energy than surface 50 even though the flux density is the same. The practical result of this is that the pumping process becomes less efficient as the cone angle increases and the disc surface becomes increasingly smaller than that of the circumscribed spherical cap. For example, the full cone angle $\alpha$ may be increased to 180° in which case the disc surface 14 with a radius $R_1$ is circumscribed by a hemisphere of radius $R_1$ and twice the surface area of the disc. With such a geometry it may be shown that in order to increase the energy flux density incident upon the disc surface $n^2 \tau$ above that possible without immersion, it is necessary to use almost twice as much input energy for $E_2$ as is required for small cone angles where the disc surface closely approximates the spherical cap of radius $R_1$. It is not desirable to make the cone angle extremely small however, since as the cone angle decreases, the light passing from the outer spherical cap 13 to the disc surface 14 makes an increasing number of somewhat lossy reflections at the conical surface, thereby decreasing the efficiency of energy transfer.

The ideal cone angle to obtain optimum performance between the limits of the hemispherical case, in which the energy input required is doubled and that of the lower limit, in which the number of reflections on the lateral surface of the conical section are greatly increased, is not known precisely. It is convenient, however, to utilize a value of $\alpha$ between 15° and 45°. One specific example constructed in accord with the invention, utilized a value of $\alpha$ approximately equal to 29°, a sphere $R_1$ having a radius of 6" and a sphere of radius $R_2$ having a radius of 9". Assuming that an average ray makes approximately one reflection from the conical surface 18 from outer sphere to inner sphere, an average reflectivity of the conical surface 18 in FIG. 1 of approximately 0.90 and an index of refraction of 1.5, the value of $W_{R_1}$ was 1.84 $W_B$, representing a relatively large increase in energy flux density, and greatly increasing the amount of pumping possible. Due to this increase in pumping, and the consequent increase in inversion thereby achieved, the total energy output of any given face-pumped laser disc may be greatly increased in accord with the invention.

From the foregoing discussion, it may readily be realized that optical immersion of face-pumped laser disc of an active laser medium approaches the improvement of increasing the incident energy flux density by a factor of $n^2$, where $n$ is the index of refraction of the laser medium. A laser module, as illustrated, may be used in a resonant structure to generate, or in a nonresonant structure to amplify, coherent optical radiation.

As described hereinbefore, the advantages of the invention are in proportion to the square of the index of refraction of the laser medium. A condition for achieving this has been stated, in the example hereinbefore, that the index of refraction of the immersion member be equal to the index of refraction of the laser medium. This is only the minimum case. Any immersion medium having an index of refraction equal to or greater than the index of refraction of the laser material is suitable. However, a close match in index results in the most efficient transfer of optical pumping energy.

While the invention has been set forth hereinbefore with respect to certain embodiment and specific examples thereof, many modifications and changes will readily occur to those skilled in the art. Accordingly, by the appended claims, we intend to cover all such modifications and changes as fall within the true spirit and scope of the present invention.

What we claim as new and desire to secure by Letters Patent of the United States is:

1. Apparatus for increasing the light flux density of pumping in an optically pumped face-pumped laser system comprising:
   (a) An active laser medium in the laser disc geometry having a thickness dimension that is smaller than its transverse dimensions and having an index of refraction represented by $n$ and a pair of opposed planar faces,
   ($a_1$) One of said faces having an area closely approximating the area of a spherical cap of radius of curvature $R_1$ and subtending a solid angle $\Omega$,
   (b) Immersion means in optical contact with said one face of said active laser medium and having a configuration filling a projection of said solid angle, an outer surface which is a segment of the surface of a second sphere of radius $R_2$, where $R_2$ is at least as great as $nR_1$ is concentric with said first sphere and has an index of refraction at least as great as $n$
   (c) Optical pumping means closely adjacent said outer surface of said second spherical surface for producing optical energy having an optical flux density $W_B$
   (d) Said immersion means being effective to cause an optical flux density approaching $n^2 W_B \tau$ to be incident upon said one face of said active laser medium,
   ($d_1$) Where $\tau$ is the hemispherical transmissivity of the surface interface of the said immersion means.

2. The system of claim 1 in which said immersion means includes a cavity for enclosing a liquid immersion fluid adjacent said one face.

3. The system of claim 1 in which all lateral surfaces of said cavity are substantially perfectly optically reflecting.

4. The system of claim 1 wherein a said solid angle $\Omega$ has a corresponding planar angle $\alpha$ which may have a value from 0° to 180°.

5. The system of claim 4 wherein $\alpha$ is between 15° and 45°.

6. The system of claim 2 wherein said cavity has the geometric configuration of a conical section.

7. The system of claim 2 wherein said cavity has the geometric configuration of a polyhedral section.

8. The system of claim 7 wherein said section polyhedral is tetrahedral.

References Cited

UNITED STATES PATENTS

| | | | |
|---|---|---|---|
| 3,230,474 | 1/1966 | Keck et al. | 331—94.5 |
| 3,354,404 | 11/1967 | Boyle et al. | 331—94.5 |
| 3,423,696 | 1/1969 | Chernoch | 331—94.5 |

RONALD L. WIBERT, Primary Examiner

P. K. GODWIN, Assistant Examiner